US005635683A

United States Patent [19]
McDermott et al.

[11] Patent Number: 5,635,683
[45] Date of Patent: Jun. 3, 1997

[54] DYNAMIC PRESSURE ADJUSTMENT OF A PRESSURE-SENSITIVE POINTING DEVICE FOR A DIGITIZER

[75] Inventors: Robert M. McDermott, Weston; Anthony M. Scialdone, West Hartford, both of Conn.

[73] Assignee: CalComp Technology, Inc., Anaheim, Calif.

[21] Appl. No.: 368,778

[22] Filed: Jan. 4, 1995

[51] Int. Cl.$^6$ .................................................. G08C 21/00
[52] U.S. Cl. ........................ 178/18; 178/19; 345/179; 73/73; 338/47
[58] Field of Search ............... 178/18, 19; 345/173–183; 73/73, 113, 4 R; 327/342; 338/47; 381/150, 173; 84/DIG. 9

[56] References Cited

U.S. PATENT DOCUMENTS

| | | |
|---|---|---|
| 4,672,974 | 6/1987 | Lee . |
| 4,979,940 | 12/1990 | Bobo, Jr. et al. ........................ 604/50 |
| 4,992,630 | 2/1991 | Mletzko ................................ 178/18 |
| 5,086,403 | 2/1992 | Slocum et al. ........................ 73/4 R |

Primary Examiner—Curtis Kuntz
Assistant Examiner—Paul Loomis
Attorney, Agent, or Firm—Rosen, Dainow & Jacobs Limited Liability Partnership

[57] ABSTRACT

This invention provides apparatus and a method which self-adjust the pressure response of a digitizer pointing device or other device incorporating a pressure transducer according to the characteristics of the particular device and/or particular user of the device. For example, a digitizer user when inputting with a stylus pointing device may use different writing styles in simulated paint brush and in simulated chalk, or, the user may use the stylus device entirely differently when using it in a game or in a graphic arts application, or different users may use the same stylus device differently for the same application. Certain pressure parameters of the device are not set on a fixed basis, which would provide for an average, typical or generic pressure range and resolution. Instead, the particular user's use of the device is monitored, and the pressure range and/or sensitivity of the device are automatically, or semi-automatically adjusted to provide a suitable pressure range and maximum resolution for the particular user.

40 Claims, 8 Drawing Sheets

DYNAMIC PRESSURE ADJUSTMENT OF A PRESSURE-SENSITIVE POINTING DEVICE FOR A DIGITIZER

BACKGROUND OF THE INVENTION

The invention disclosed herein relates generally to reporting information to a host computer relating to the pressure applied to a transducer of a pressure-sensitive input device. The transducer has a raw pressure range and sensitivity, and the invention more specifically relates to adjusting the pressure range and sensitivity reported to the host computer. In a specific embodiment, the input device is a pointing device such as a stylus or cursor which is part of an absolute position determining system. The pressure may be applied to the transducer by pressing the device against a surface or by pressing a button or like element carried by the device. When used as part of an absolute position determining system, the transducer inputs the raw pressure-related information to a processor of the position determining system. The absolute position determining system may be a digitizer which includes a processor coupled to receive the raw pressure-related information from the transducer.

Although a pressure-sensitive device incorporating the invention may be employed as an input device with many types apparatus, its presently preferred use is as a pointing device for a digitizer. Examples of pressure-sensitive styli for digitizers are described in U.S. Pat. Nos. Re. 34,095 (Padula et al.) and 5,004,871 (Purcell). The disclosures of those two patents are incorporated herein by reference. A pressure sensitive pointing device has a transducer for detecting the pressure being applied to its tip, or to one or more finger-operated switches. The transducer is ultimately coupled to a processor, typically located in a digitizer tablet which also contains means which cooperate with the pointing device for determining the position of the pointing device relative to a surface of the tablet. The pointing device transmits information related to the detected pressure via a signal conductor or other means (e.g., telemetry) to the digitizer tablet, which in turn processes the raw information and reports it via a signal conductor or other means (e.g., telemetry) to the host computer.

The invention is described below in connection with a digitizer, specifically an electromagnetically coupled digitizer, which includes a pointing device incorporating a pressure transducer and a digitizer tablet incorporating a processor and other circuits. However, the invention is not limited to use with pointing devices got digitizers, and when used in a digitizer, the invention is not limited to any particular digitizer technology or to any particular processing configuration. For example, the digitizer may employ any suitable technology including, but not limited to electromagnetic, electrostatic, magnetostrictive, resistive, ultrasound, optical, etc., and the processor ultimately coupled to the transducer in the pointing device may be part of the pointing device or part of the host computer. Also, the processor of the digitizer may be incorporated in the host computer rather than in the digitizer tablet.

There is considerable variation on the pressure response of pressure-sensitive pointing devices. However, to keep costs low, digitizer manufacturers did not heretofore calibrate the responsiveness of pressure-sensitive pointing devices and did not compensate for manufacturing variations in the pressure response of the pointing devices. Instead, as discussed below, they set the pressure sensitivity and range to accommodate an "average" user. This has the drawback that all users, whether heavy-handed or light-handed, must adjust to a pre-defined pressure response, which for many users is not optimal.

In order to facilitate understanding of the operation of a pressure-sensitive pointing device and the manner in which its range and sensitivity are set, conventionally and in accordance with the invention, certain terms used below are defined. Also, pressure (or force) applied to the tip or a finger-operated switch of the pressure-sensitive pointing device will be referred to below simply as pressure applied to the pointing device. Further, the information related to the pressure applied to the pointing device which is transmitted by the pointing device for use by the processor is described herein in terms of "counts" of arbitrary units which monotonically increase with the amount of pressure applied.

Raw Pressure Count: The count transmitted by the pointing device, which may be a number between 0 and M where M is some maximum number. Typically, the maximum is a power of 2 (less 1), conforming to, for example, the maximum value which can be held in some fixed number of bits, e.g. 127 for 7 bits, 255 for 8 bits, etc..

Minimum Raw Pressure Count: The count transmitted by the pointing device with no external pressure applied thereto. To allow for mechanical tolerance and lack of calibration, this number is "designed" to be non-zero.

Maximum Raw Pressure Count: The count transmitted by the pointing device with "maximum pressure" applied thereto. To allow for mechanical tolerance and lack of calibration, this number is "designed" to be less than M, where M is described above.

Maximum Pressure: The pressure applied to the pointing device at which the raw pressure count remains constant with no discernible change with increased pressure applied to the pointing device.

Raw Pressure Range: Maximum Pressure minus zero.

Raw Pressure Count Range: Maximum Raw Pressure Count minus Minimum Raw Pressure Count.

$$\text{Raw Pressure Count Sensitivity:} \frac{\text{Raw Pressure Count Range}}{\text{Raw Pressure Range}}$$

Reported Pressure Count: The count provided to the application program as an indication of the amount of pressure that the user is applying to the pointing device. The application program typically uses this count to determine, for example, the width of the line to be drawn on the screen (simulating a paint brush in a graphic arts application), or the darkness of the line (simulating artist chalk), or the speed of animation (simulating an accelerator in a game-like program).

Maximum Reportable Pressure Count: The count which, by convention, represents "saturation". Typically, this limit is set by the "format" established for representing pressure to the application program. In the application program, for example, when this count is reached, the application will draw the "widest" line, the "darkest" line, or apply the "maximum" acceleration.

Minimum Reportable Pressure Count: Typically, this count, by convention, should be zero. But, due to manufacturing variations and lack of calibration, some pressure-sensitive pointing devices (and the associated system for processing raw counts and providing count reports to the applications program) report a non-zero value (a "pre-load" value) when no external pressure is being applied to the pointing device.

Reportable Pressure Range: Maximum minus Minimum Reportable Pressure Counts

Report Pressure Sensitivity: The change of Reported Pressure Counts per change of applied User Pressure (defined immediately below).

User Pressure: The pressure applied to the pointing device by the user.

User Pressure Range: The range of pressure a particular user will apply in using the pointing device.

Heavy-Handed User: Uses large User Pressure Range

Light-Touch User: Uses small User Pressure Range

The drawbacks of prior pressure sensing systems will be discussed for ease of discussion in connection with a graphic arts application program in which the Reported Pressure Count represents the width of a line to be drawn by the applications program running in the host computer. Assume that the widest line that the application program will draw is 20 pixels (or dots in a matrix display or printer) wide, and that convention establishes a Maximum Reportable Count of 100. Thus, the application program will transform (perhaps, although not necessarily, by linear interpolation) the 100 reported counts into 20 pixel line widths.

Since an application program is designed to work with a variety of commercially available pressure-sensitive pointing devices, and some have a pre-load so that the pointing device transmits a non-zero, positive Raw Pressure Count without any pressure being applied to the pointing device, a typical Reported Pressure Count to line width transformation (interpolation) might be:

| Reported Pressure Count | line width |
|---|---|
| 0–5 | 0 (no drawing for counts caused by pre-load) |
| 6–9 | 1 |
| 10–14 | 2 |
| {...} | ... |
| 95–97 | 19 |
| 97–100 | 20 |

For a particular pointing device with a Minimum Raw Pressure Count of 1000, a Maximum Raw Pressure Count of 9000 and a Maximum Pressure produced with two pounds of force applied, and, for simplicity, having a linear response, the Raw Pressure Count Sensitivity would be 250 Raw Pressure Counts per ounce of force applied. (9000−1000)/(2*16). Assume that this particular pointing device was from a lot of pointing devices whose characteristics vary, due to manufacturing tolerances, etc., and that the particular pointing device's characteristics are within the range expected for the lot. Since the reporting system was not calibrated for the particular pointing device, the transformation from raw counts to reported counts was heretofore based on a "typical" pointing device or a "worse case" pointing device, or on some other statistical representation of a pointing device's performance (collectively referred to below as a "generic" pointing device). Thus, for example, the statistical representation of a generic pointing device used to determine the transformation may have used 800 as the Minimum Raw Pressure Count, and 6800 as the Maximum Raw Pressure Count at 30 ounces of force for a Raw Pressure Count Range of 6000 counts (for a calculated "generic" resolution of 200 counts per ounce). To transform the Raw Pressure Count Range of 6000 into a maximum Reportable Pressure Count of 100, by linear interpolation (other interpolations may be used) each 60 raw counts equals 1 Reported Pressure Count. Thus, the pre-load count of 1000 on the particular pointing device results in a Reported Pressure Count of 3.33 ((1000−800)/60)), which is reported as a "3". To draw a one pixel wide line, the Reported Pressure Count would have to reach 6, which equates to a user-applied force of 0.64 oz. (Raw Pressure Count of 1160=1000+(250 cts/oz.*0.64 oz); transformed by (1160−800)/60 to a count of 6). To draw a two pixel wide line, the user would have to apply 1.6 oz., which produces a Raw Pressure Count of 1400. (1000+250* 1.60) A Raw Pressure Count of 1400 produces a Reported Pressure Count of 10 ((1400−800)/60). Thus, changing the line width by one pixel requires a change of force of one ounce, using the above example.

To draw a maximum width line, the user would have to apply about 22½ oz. of force, which is too much pressure to require while drawing a line. Therefore, most applications (or drivers which buffer the information between the digitizer processor and the application) allow the user to scale the values up or down. Thus, for example, a Light-Touch User may want to scale the range down by a factor of 10, so that 2.2 ounces is sufficient to draw the widest line. Or a Heavy Handed User may want to scale down by a factor of 2, for an 11 ounce maximum User Pressure Range.

However the Light Touch User will lose some ability to draw lines of particular widths if the user scales down by 10. Since the pre-load value reported by the pointing device of the above example is 3, scaling down by 10 produces a count of 30 which would produce a line about 5 pixels wide. Even if the application or the driver allowed the user to offset the count by the pre-load amount (to produce 0 instead of 30), by subtracting 3 from the reported count, a problem remains. When the user applies pressure and a count of 4 is produced, it will be scaled up to 10 [(4−3)*10], producing a two pixel wide line. When a 5 count is produced, a four pixel wide line is produced. Thus, by scaling by a factor of 10, the user is precluded from obtaining the desired degree of control over the widths of the line. (In this example, lines of 1 or 3 pixels width can not be selected).

To scale and still allow for the selection of each line width, the user would have to limit the scaling to a factor of 3 or 4. With a factor of 3, the user would have to apply over 7 ounces to draw a widest width line, and 7 ounces may not be comfortable to a Light Touch User.

Alternatively, some systems allow the user to change the internal transformation factors. Thus, in the above example, the user could direct the system to set 1000 as the Minimum Raw Pressure Count (instead of the 800 default), and 1600 as the Maximum Raw Pressure Count, which, for the particular pointing device in the above example, would equate to a Maximum Pressure of 2.4 oz. needed to achieve the Maximum Reportable Pressure Count. This, however, is not a simple process, as it requires the user to understand the basic operations of the pointing devices and the mechanics of a mathematical transformation. The typical user of a pressure-sensitive pointing device is not a mathematician, and requiting the user to perform these tasks would seriously detract from the system's acceptability.

Other systems set the transformation parameters lower than the achievable Raw Pressure Maximum, thereby increasing the pointing device's sensitivity for the Light Handed User, but in so doing, they reduce the Raw Pressure Range. A reduction in the Raw Pressure Range will be disadvantageous to a Heavy Handed User—a person who normally leans hard on a pen is not going to be satisfied by a pointing device that produces the maximum line width at 2 or 3 ounces, and may not be able to modify his/her drawing style to control the line width at this low pressure/high sensitivity range.

Because of these human factors, most pressure-sensitive pointing device manufacturers adjust the transformation parameters not only for the generic pointing device's performance, but also for the typical user's preferences. As a result, the pointing device may be acceptable to most people, but is less than optimal to most people also.

OBJECTS AND SUMMARY OF THE INVENTION

It is an object of the invention disclosed herein to automatically set the level at which a particular pressure-sensitive pointing device (or other device incorporating a pressure transducer) begins to indicate (e.g., starts reporting) that pressure is being applied to the device while the device is in use with or without command by a user and without the need for the user to make any calculations. It is another object of the invention to do so with or without pressure being applied to the device.

It is another object of the invention to automatically set the level at which a particular pressure-sensitive pointing device (or other device incorporating a pressure transducer) stops indicating (e.g., stops reporting) that pressure is being applied to the device while the device is in use, with or without command by a user and without the need for the user to make any calculations.

It is another object of the invention to automatically optimally set the pressure-sensitivity and range of a pressure sensitive pointing device (or other device incorporating a pressure transducer) based on the characteristics of a particular device and a particular user, with or without command by a user with little or no user intervention.

This invention provides apparatus and a method which achieve the above as well as other objects by self-adjusting the pressure response of the pointing device or other device incorporating the pressure transducer according to the characteristics of the particular device and/or particular user.

According to the invention, and with respect specifically to a digitizer pointing device though the invention is not limited to use in a digitizer, certain pressure parameters are not set on a fixed basis which would provide for an average, typical or generic pressure range and resolution. Instead, the particular user's use of the pointing device is monitored, and the pressure range and/or sensitivity of the pointing device automatically are dynamically adjusted to provide a suitable pressure range and maximum resolution for the particular user, either continuously or when initiated by the user, i.e., with or without a command from the user.

The pressure range and/or sensitivity may be set (i.e., re-set) at will. This feature adjusts to a user. The same user may use the pointing device differently in different applications. For example, the user may use different writing styles in simulated paint brush and in simulated chalk, or, the user may use the pointing device entirely differently when using it in a game or in a graphic arts application. Therefore, the term "particular user" should be understood to mean "particular user in a particular application at a particular time as the situation demands".

In accordance with the invention, a specific pre-load value is not selected and calibration is not required to produce a Minimum Raw Pressure Count of some specified value. Instead, the Minimum Raw Pressure Count is adjustable and is set to an initial value (referred to below as PMIN default) for the particular pointing device being used. In one embodiment it is then adjusted downwardly when the actual Raw Pressure Count is less than the initially set minimum. The initial Minimum Raw Pressure Count is set to a value large enough to ensure that over the range of variations expected in the manufactured pointing devices, the initial set value will exceed the Minimum Raw Pressure Count. To prevent setting an erroneous Minimum Raw Pressure Count, the pointing device is enabled to do so only under certain conditions, such as when the pointing device first comes within a given range of proximity to a position sensing means with which the pointing device operates. Adjusting the Minimum Raw Pressure Count only upon the pointing device first coming into range (i.e., when the pointing device transitions between out of range and in range) ensures that the Minimum Raw Pressure Count will not be set as a result of the pointing device being pressed against a surface of the position sensing means. For example, this prevents the Minimum Raw Pressure Count from changing when a user releases pressure, which might otherwise occur where the pressure transducer in the pointing device has a tendency to "overshoot" when pressure is released.

The number to which Maximum Raw Pressure Count (PMAX) is set determines the pressure sensitivity of the device. Rather than set a fixed Maximum Raw Pressure Count, and thereby a fixed sensitivity and pressure range, a maximum feasible sensitivity (e.g., in the order of full count reported output with less than a half ounce of force applied) is initially set. This sensitivity will be the best achievable sensitivity for the technology employed in the pointing device. By definition, however, a high sensitivity implies a narrow range. If the user is able to operate in this narrow range, the user will be using the best/optimal setting for the particular pointing device. Very few users, however, will be able to control the pressure they apply to the pointing device to within this half ounce range to achieve this maximum sensitivity.

The invention provides for a dynamic range of sensitivity, to accommodate for a particular user's ability, or preference. A dynamic range, in this context, is a range which can change continuously in response to the pressures applied to the pointing device. A constant range, in contrast, is a range which is preset (at the factory) and cannot be changed. A static range is a range which is adjustable by the user, but which remains constant until the user adjusts it again. The difference between static and dynamic is that a separate procedure is usually carded out to make adjustments to the static settings (also referred to as semi-automatic), whereas adjustments are made continuously (and automatically) in a dynamic system. A combination of static and dynamic adjustment is feasible according to the invention. In this combination, the dynamic adjustment is made until the user disables it, at which time the range becomes static until the user enables the dynamic feature again.

The full scale range of user input pressure is defined as the amount of pressure required to achieve a full range of counts of output. (PMAX-PMIN). According to this invention, this full scale range is initially set (MIN_RANGE default) to be very small to provide for maximum sensitivity within this range. If the user operates beyond this narrow input pressure range, the range will be adjusted automatically (dynamically) to accommodate for this user. If the full scale range of counts of output remains constant, and the range of input pressure increases, the resultant sensitivity (the number of counts of output per unit of input pressure) decreases. Although the sensitivity will be less, compared to the initial settings, this sensitivity will be optimal for this particular user. If the output range is 0 to 100, and a user applies 0 to 10 ounces in normal use, by a linear interpolation, the optimal sensitivity for this particular user is 10 counts per ounce of input pressure. If a different user applies 0 to 5 ounces in normal use, the optimal setting for this particular user is 20 counts per ounce of input force. In both cases, the application of "maximum" pressure by the particular user (10 ounces in one case, 5 in the other), will result in the reporting of the maximum, 100, counts. Thus, by adjusting the full scale range of input pressure to match the particular user's range of applied input pressures, this invention provides for a pointing device with optimal sensitivity.

In one embodiment, this range adjustment is accomplished by increasing the Maximum Raw Pressure Count (PMAX) parameter, which sets the full scale range of user input pressure (PMAX-PMIN), whenever the user applies more pressure than the Maximum Raw Count allows (i.e., whenever the pointing device "bottoms out" prematurely.)

As in the case of the automatic setting of the Minimum Pressure Raw Count, this feature of adjusting the Maximum Raw Pressure Count will be disabled during unusual events, such as when it is determined that the user applied a sharp pressure to the pointing device (i.e., a relatively high pressure for a relatively short time), which is not representative of the prevailing characterization of the user's range of applied pressure.

The minimum and maximum pressure signals may be adjusted as follows. The raw pressure signals coupled from the particular pressure transducer are monitored during use thereof. A minimum value higher than the lowest raw pressure signal typically expected and/or a maximum value lower than the highest raw pressure signal typically expected during use of the particular pressure transducer is or are selected (or set). The selected or set value is reduced in the case of a minimum value whenever the value of the raw pressure signal is less than the selected value, and is increased in the case of a maximum value whenever the value of the raw pressure signal is greater than the selected value. Subsequent adjusted pressure signals are provided which are interpolated within the adjusted minimum and maximum values. The adjustment of the minimum pressure signal may be carried out with or without pressure being applied to the transducer and the adjustment of the maximum pressure signal is carded out with pressure applied to the transducer. Also, the adjustment may be carded only in response to a given condition, as discussed below.

The minimum or maximum pressure value may alternatively be adjusted to simply replace a previous raw pressure value instead of as a result of a comparison with a previous minimum or maximum value. Here, a subsequent raw pressure value replaces a previous raw pressure value in the determination of the adjusted minimum and maximum pressure signals. Preferably, the minimum and/or maximum pressure value is adjusted only in response to a given condition. For example, the minimum pressure value may be adjusted when the pointing device first comes into range, and the minimum and maximum values may be adjusted by user initiation as discussed below in connection with semi-automatic operation.

There may be users who are dissatisfied with a dynamically changing pressure range and resolution, or applications for which such changes are inappropriate. As mentioned above, the invention also provides an embodiment for semi-automatically setting the pressure range (a static pressure range) and resolution with some user interaction to address this need. In this semi-automatic embodiment, the user sets the desired range and resolution, without calculating or determining the parameters of the particular pointing device being used, which then remain unchanged (static) until the user resets them. This embodiment may be provided together with the fully automatic setting embodiments described above, or alone. When provided with fully automatic embodiments, the user determines whether to operate in a fully automatic setting mode or in a semi-automatic setting mode. A pressure range and resolution set in the semi-automatic mode will remain until either reset by the user or the user entering the fully automatic setting mode.

According to a specific semi-automatic mode embodiment, the user initiates a minimum pressure set sequence, which includes a monitoring period during which the pressure is monitored, after which the Minimum Raw Pressure Count is set in accordance with the minimum pressure applied during that monitoring period. For example, the low end pressure threshold may be set to a desired non-zero value by a user who prefers to allow for some pressure to be applied before actually activating an event in the application program. Such a user might be one who has a tendency to "drag" the tip of the pen across the surface, without actually intending to draw a line. Similarly, during a maximum pressure set sequence initiated by the user, the pressure is monitored during a monitoring period and then the Maximum Raw Pressure Count is set in accordance with the maximum pressure applied during that monitoring period. This allows the user to set the pressure at which the pointing device "bottoms out". The digitizer may provide for user initiation of a set sequence in any suitable manner. For example, a change in the status of a switch or switches carded by the pointing device or digitizer tablet may initiate a set sequence. Alternatively, a change in an input device (e.g., a keyboard or other device coupled to the host computer) may initiate a set sequence. Also, a specific sequence of activations of the switch or switches of the pointing device or digitizer or of the host computer input device may initiate a set sequence. Further, where an application program provides, the digitizer tablet may be used as a menu where a sequence is initiated using the pointing device to point to the appropriate location on the menu.

BRIEF DESCRIPTION OF THE DRAWINGS

The invention is illustrated in the figures of the accompanying drawings which are meant to be exemplary and not limiting, in which like numerals refer to like or corresponding parts, and in which.

DESCRIPTION OF THE PREFERRED EMBODIMENTS

Although the preferred embodiment of the invention is described below in connection with reporting the pressure applied to the tip of a stylus for a digitizer to an applications program (e.g., a CAD or graphics arts program) in a host computer, the invention may be embodied in other ways and used for other applications.

Figure 1:
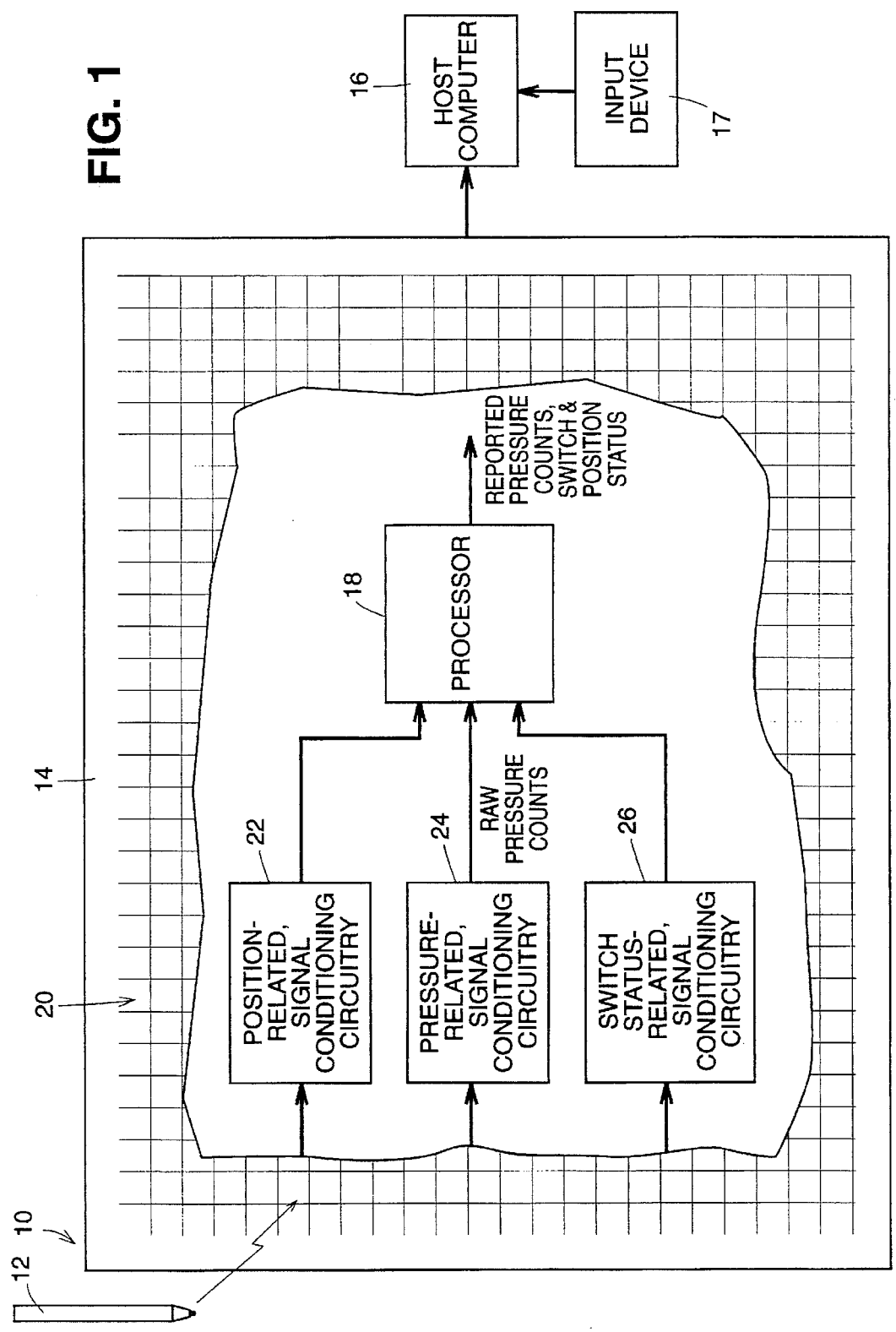
FIG. 1 is a schematic block diagram of a digitizer incorporating the invention, including a pressure-sensitive stylus and a digitizer tablet containing circuitry for processing pressure-related and switch status-related information provided by the stylus via a cordless communications link between the stylus and the digitizer tablet, as well as for digitizing the position of the stylus relative to the digitizer tablet.

Referring to FIG. 1 of the drawings, a digitizer 10 incorporating the invention includes a pressure-sensitive stylus 12 and a digitizer tablet 14 coupled to a host computer 16. The host computer may have one or more input devices 17 other than the digitizer 10 coupled thereto, such as a keyboard, etc. In this embodiment, the stylus 12 is cordless, i.e., not tethered to the digitizer tablet, and transmits raw pressure information related to the pressure detected by a pressure transducer in the stylus via a wireless communication link. The stylus 12 derives its power from a battery or batteries carried by the stylus, but may be powered in other ways without a wire connection to the tablet 14 which are known in the digitizer art. The digitizer 10 may employ any suitable technology, but in the embodiment described, employs electromagnetic technology. The digitizer tablet 14 includes a conductor system 20 (commonly referred to as a "grid") in which signals transmitted by a coil in the stylus 12 are electromagnetically induced. The conductor system 20 is coupled to position-related, signal conditioning circuitry 22, pressure-related, signal conditioning circuitry 24 and switch status-related, signal conditioning circuitry 26. With respect to the pressure-related and switch status-related signals, the conductor system 20 functions as an antenna to receive those signals from the stylus. The conditioning circuitry 24 and 26 is coupled to the conductor system 20 in known manner, e.g., via multiplexers. The pressure-related, signal conditioning circuitry 24 detects the raw pressure-related information transmitted by the stylus 12 and converts it to a form suitable for processing by the processor 18, which operates on the converted raw pressure-related information in accordance with the invention, and reports it via a wire or wireless link to the host computer 16.

Figure 5:
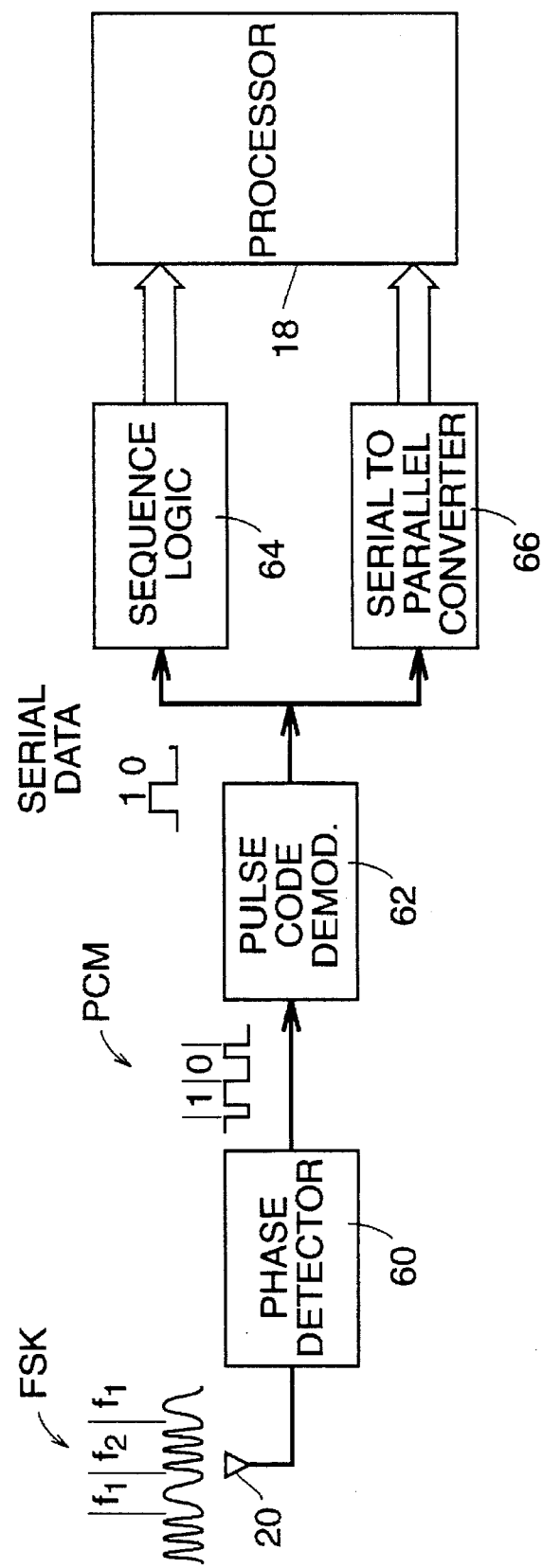
FIG. 5 is a block diagram of circuitry in the digitizer for conditioning the pressure-related information detected by the digitizer tablet.

Similarly, the switch status-related, signal conditioning circuitry 26 detects the raw switch status-related information transmitted by the stylus 12, and converts it to a form suitable for processing by the processor 18, which operates on the converted raw switch status-related information, and reports it to the host computer 16. Also, the position-related, signal conditioning circuitry 22 as controlled by the processor 18 detects raw position-related signals transmitted by the stylus 12 induced in the conductors of conductor system 20, and converts the detected signals to a form suitable for processing by the processor 18, which operates on the converted raw position-related signals, determines the relative position of the stylus 12 and reports the position as digitized position information to the host computer 16. The conductor system 20, its coupling to circuitry 22, 24 and 26, coupling of the stylus 12 to the conductor system 20, the position-related conditioning circuitry 22, the specific pressure-related, signal conditioning circuitry 24, the switch status-condition circuitry 26, and the processing and reporting of position information and switch status information do not form part of the invention disclosed herein. Such may be conventional, and are well known in the digitizer art. However, a specific embodiment of pressure-related, signal conditioning circuitry 24 is shown in FIG. 5 and is described below.

Figure 2:
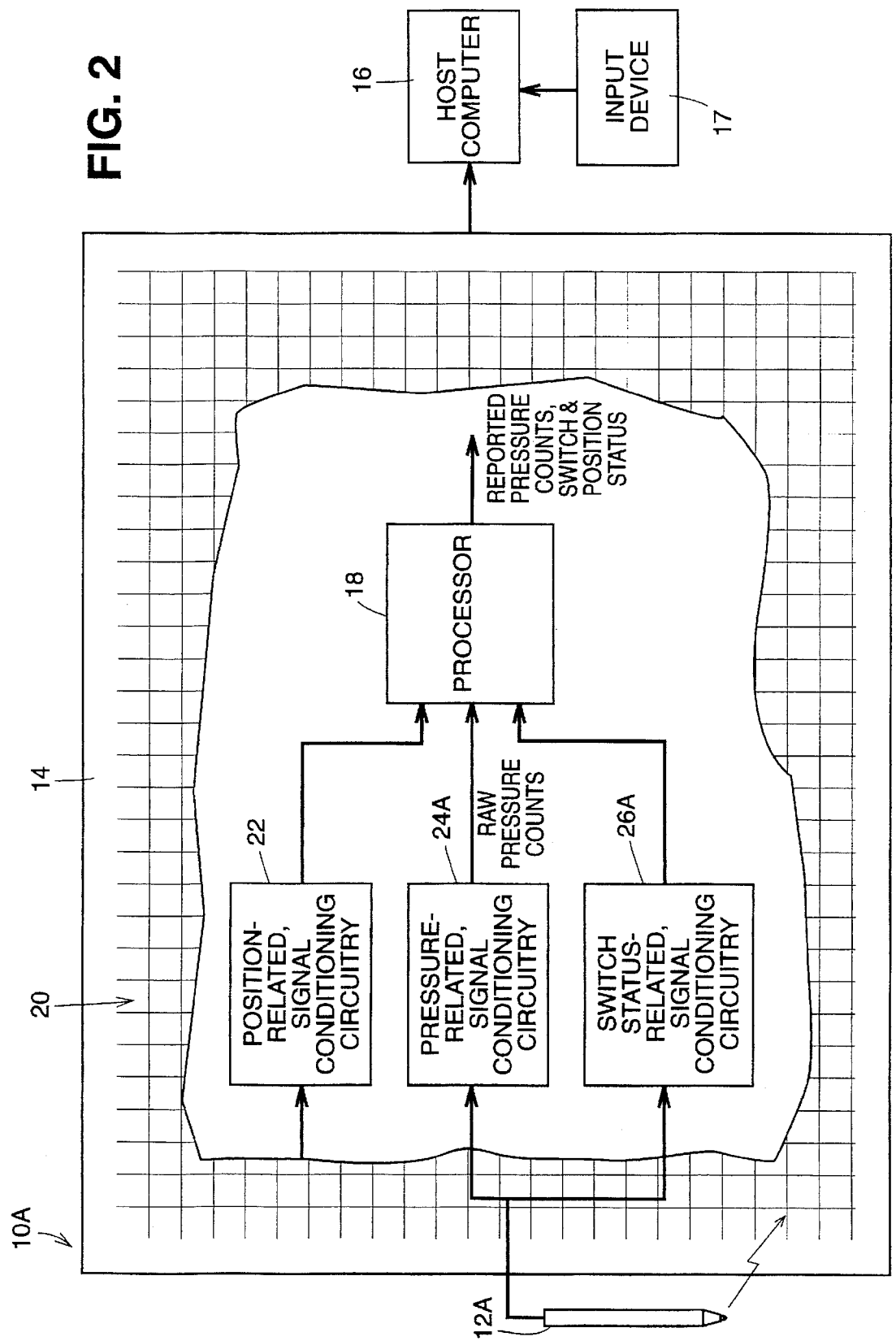
FIG. 2 is a schematic block diagram of a digitizer incorporating the invention, including a pressure-sensitive stylus and a digitizer tablet containing circuitry for processing pressure-related and switch status-related information provided by the stylus via a corded connection between the stylus and the digitizer tablet, as well as for digitizing the position of the stylus relative to the digitizer tablet.

The digitizer 10A shown in FIG. 2 is similar to the digitizer 10, with the primary difference being a wire connection between the stylus 12A and the pressure-related, signal conditioning circuit 24A and the switch status-related, signal conditioning circuitry 26A, and other differences relating to transmission of the pressure-related and switch status-related signals by wire rather than wirelessly as in FIG. 1. Although the digitizers 10 and 10A operate by transmitting position-related signals wirelessly from the stylus to the conductor system 20 (commonly referred to as "cursor driven"), the digitizer 10A may operate by the conductor system transmitting position-related signals to the stylus which would then transmit by wire signals detected by the stylus to position-related, signal conditioning circuitry in the tablet (commonly referred to as "grid driven"). Details relating to the digitizer 10A, whether cursor driven or grid driven, are known in the digitizer art. Those of ordinary skill in the digitizer art will understand how to construct and use the invention in a corded digitizer 10A from the discussion below with respect to the cordless digitizer 10.

Figure 3:
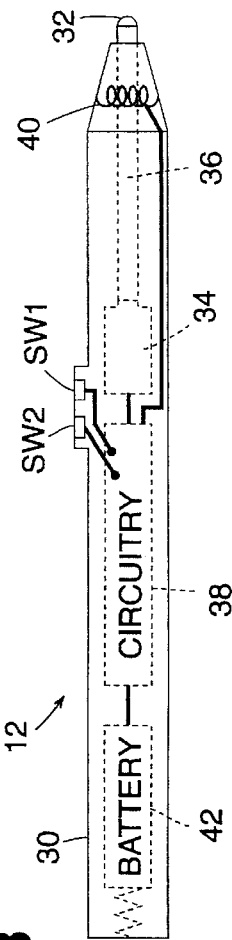
FIG. 3 is a schematic diagram of the cordless stylus depicted in FIG. 1.

Referring to FIG. 3, the stylus 12 includes a barrel or housing 30, a tip 32 protruding from one end of the housing 30 and a pressure transducer 34 coupled to the tip 32. The stylus 12 also includes circuitry 38, shown in FIG. 4, a coil 40, two finger operated switches SW1 and SW2, and one or more batteries 42. The coil 40 transmits the pressure-related and switch-status related signals described above, and interacts with the conductor system of digitizer tablet 14 to provide position-related signals to the position-related signal conditioning circuitry 24.

The stylus tip 32 (FIG. 3) may be the end of a rod 36 which interacts with the pressure transducer 34 and transmits thereto the pressure applied by the tip 32 against a surface, or a displacement related to the pressure applied by the tip 32. The particular pressure transducer 34 employed does not form part of the invention, and any suitable pressure transducer may be used. The pressure transducer 34 may require noticeable or unnoticeable displacement of the rod 36 in order to provide a pressure-related signal to the circuitry 38. In the preferred embodiment, the pressure transducer 34 is a proprietary transducer sold by Interlink Electronics, Inc. under the trademark "FSR" (Force Sensing Resistor). The operating principles of such a transducer are described in U.S. Pat. Nos. 4,314,227 and 4,314,228 of Franklin N. Eventhoff. The pressure response of an FSR transducer may be made to suit specific applications. The switches SW1 and SW2 may be conventional and may be used conventionally, as is known in the digitizer art.

Figure 4:
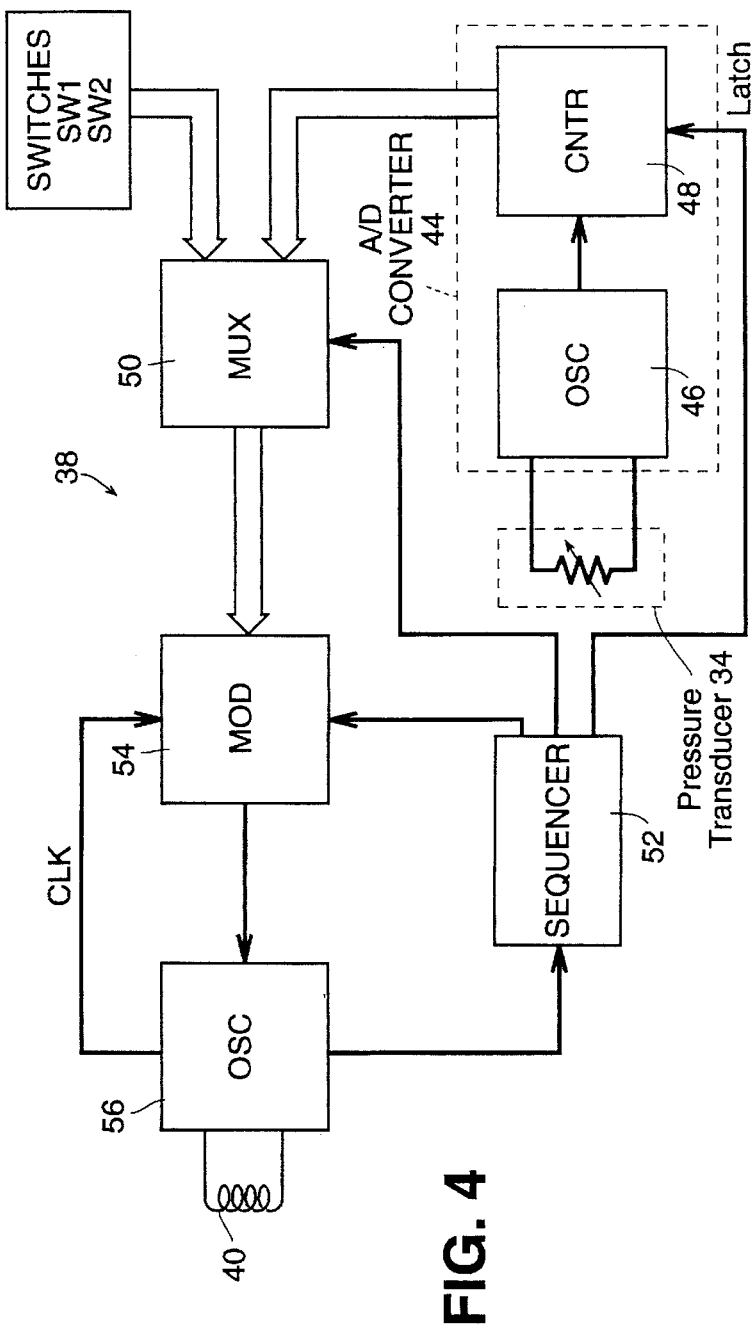
FIG. 4 is a block diagram of a preferred embodiment of circuitry associated with the stylus of FIG. 1 for generating and transmitting to the digitizer pressure-related and switch status-related information, and signals used by the digitizer tablet to digitize the position of the stylus relative to the digitizer tablet.

Referring to FIG. 4, the pressure transducer 34 is shown schematically as a variable resistor whose resistance varies with the pressure applied to the tip 32. The change in resistance (or other parameter for another transducer) may manifest itself in analog form, and, if so, must be converted to digital form by an analog to digital converter 44. In the case of a variable resistance transducer, the A/D converter 44 may comprise an oscillator 46 whose frequency is determined by the variable resistance and a counter 48 which counts the pulses generated by the oscillator 46 during a given time period. The count in the counter 48 is then representative of the pressure applied to the tip 32. The counter 48 will have as many parallel output bits as necessary to achieve the desired pressure range and resolution for the pressure-sensitive feature of the stylus 12. In the preferred embodiment, the counter 48 provides 16 bits of pressure-related information.

The parallel outputs of the A/D converter 44 (counter 48) and one terminal of each of the switches SW1 and SW2 (and other switches if present in the stylus 12) are coupled to a multiplexer 50. The switches may be connected in known circuits such that opening and closing a switch causes the terminal coupled to the multiplexer 50 to change logic levels. The multiplexer 50 under control of a sequencer 52 time multiplexes the pressure-related parallel outputs of the A/D converter 44 and the switch status-related parallel outputs of SW1 and SW2 to modulator 54, which converts the data input thereto into a serial data stream, also under control of sequencer 52. The serial data stream output from modulator 54 modulates the signal generated by the oscillator 56 with the time multiplexed pressure-related and the switch status-related information, and that modulated signal is transmitted by coil 40 to the digitizer tablet. The frequency of oscillator 56 is set for suitable electromagnetic coupling of the signal transmitted by the coil 40 to the conductor system 20 and for suitable modulation thereof by the modulator 54, e.g., 200 KHz. The modulator 54 may cause the signal generated by the oscillator 56 to be modulated according to any suitable modulation scheme, e.g., pulse width modulation (PWM), pulse code modulation (PCM), or frequency shift keying (FSK). Modulation of the signal transmitted by a stylus to the conductor system of a digitizer tablet is well known in the digitizer art. The sequencer 52 operating from the oscillator 56 provides timing for the A/D converter 44, the multiplexer 50, and the modulator 54.

The data output of the modulator 54 may be arranged in bytes. For example, byte 1 may contain the switch status-related information, bytes 2 and 3 the pressure-related information, etc. A sync signal is also output by the stylus 12 and is used by the digitizer tablet 14 to time (a) conditioning of the modulated signal transmitted by the coil 40, (b) decoding of the switch status-related and pressure-related information and (c) position detection. The synch signal may be generated conventionally, and may be coupled to the digitizer as described in application Ser. No. 368778, titled "Cordless Digitizer with Synch Signal Generator," filed Dec. 20, 1994 as a continuation of Ser. No. 08/212,400, filed Mar. 11, 1994 and now abandoned. The disclosure of that pending application is hereby incorporated herein by reference. The synch signal may also be coupled to the digitizer tablet in other ways known in the digitizer art.

Referring to FIG. 1, the pressure-related information is conditioned by circuitry 22 into digital form suitable for processing by processor 18. The specific implementation of pressure-related, signal conditioning circuitry 24 depends upon the specific modulation technique employed by the stylus 12. As a general matter, conditioning circuitry 24 includes a demodulator, and may include a serial-to-parallel converter depending upon whether serial or parallel data is supplied to processor 18. In the specific case of frequency shift keying (FSK) of pulse code modulation (PCM) of the pressure-related signals transmitted by coil 40 of stylus 12, referring to FIG. 5, conditioning circuitry 24 includes a phase detector 60, a pulse code demodulator 62, sequence logic 64 and a serial-to-parallel converter 66. The conductor structure 20 in the digitizer 10, in which are induced signals transmitted by the stylus, is represented in FIG. 5 by an antenna symbol. The phase detector 60 detects the frequency shaft keying of the PCM signals. The pulse width demodulator 62 demodulates the detected PCM signal and converts it into a serial data stream, as shown in FIG. 5, representing the pressure applied to the tip of the stylus. The sequence logic 64 identifies the particular byte of the serial data stream, and the serial-to-parallel converter 66 converts the serial data stream, byte by byte, to parallel data. The processor 18 receives the parallel data from converter 66, and may be any conventional microcontroller or microcomputer, such as Intel 80C196. The phase detector 60, the pulse code demodulator 62, the sequence logic 64 and the converter 66 may all be conventional, and are known to those of skill in the art to which they relate.

The conditioning and processing of the position-related signals and the switch status-related signals do not form part of this invention, and may be implemented and accomplished as now known in the digitizer art.

The processor 18 processes the pressure-related information as follows. The main flow of the program controlling processor 18 includes the flow portion 100 shown in FIG. 6 for obtaining the raw pressure-related information provided by conditioning circuitry 24, and if the stylus pressure-adjustment feature is enabled, converting the raw pressure-related information in accordance with the invention. As discussed above, the pressure adjust feature may always be enabled, or may be enabled by the user via the stylus 12, the digitizer tablet 20 or the input device 17 to host computer 16. In step 102, the processor 18 calls up the Raw Pressure Count (PRAW), and in step 104 determines whether the stylus pressure-adjustment feature is enabled. If it is not, the processor proceeds to step 106 and converts the Raw Pressure Count (PRAW) to the Reported Pressure Count (PCOUNT) conventionally using the fixed default Minimum and Maximum Raw Pressure Counts. If the stylus pressure-adjustment feature is enabled, the program in a sub-routine 108, flow charted in FIG. 7, checks and dynamically adjusts the Minimum and Maximum Raw Pressure Counts (PMIN and PMAX) in steps 108-1 and 108-2, and in step 106 converts the Raw Pressure Count (PRAW) to a Reported Pressure Count (PCOUNT) based on the dynamic adjustments made in sub-routine 108. The digitizer then in step 110 transmits the Reported Pressure Count (PCOUNT) to the host computer conventionally, which may be transmitted along with other reported information. In converting PRAW to PCOUNT, step 106 also performs the transformation, e.g., by linear interpolation, of the raw pressure counts within the pressure range, i.e., $$PCOUNT=(PRAW-PMIN)/(PMAX-PMIN)*MAX\_P\_COUNTS.$$

Thus, the range and sensitivity are automatically adjusted with an adjustment of PMIN, PMAX or both.

Figure 7:
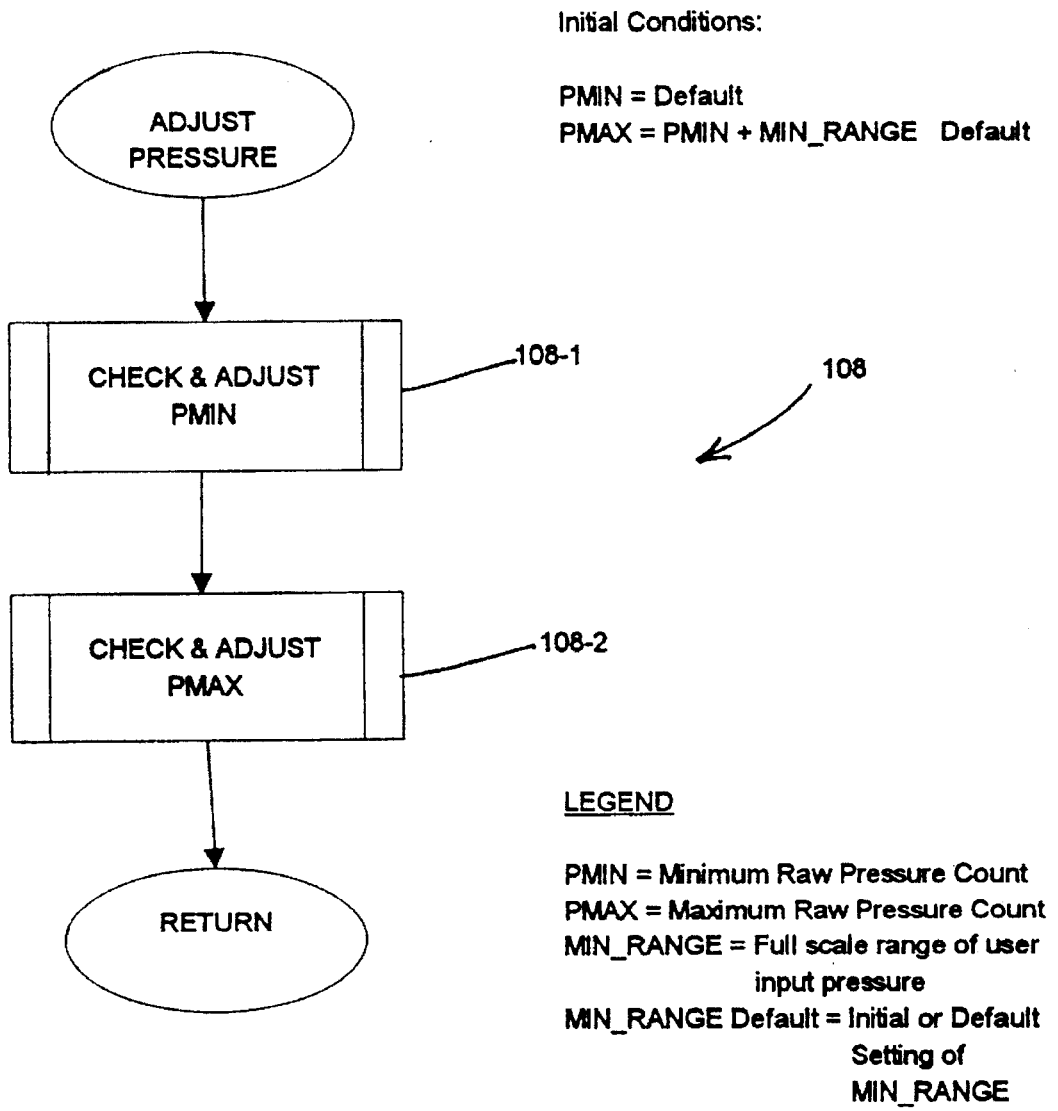
FIG. 7 is a flow chart of the Pressure Adjust routine of the flow chart portion depicted in FIG. 6.

Referring to FIG. 7, The initial conditions for PMIN and PMAX are PMIN=default and PMAX=PMIN+MIN_ RANGE default (the initial or default full scale range). The MIN_RANGE default value may simply be one-half of the typical raw pressure range for a particular type of transducer, or a lower value if increased sensitivity is initially desired. Thereafter, during use of stylus 12, PMIN and PMAX are set in accordance with dynamic use of the stylus pressure feature as flow charted in FIGS. 8 and 9, for example. The PMIN default value is set in accordance with the typical low pressure (or pre-load) raw pressure count produced by the particular type of transducer and circuitry employed. The MIN_RANGE default value is set in accordance with the range of raw pressure counts produced, for example, by a half ounce of force, or to a value equivalent to a given percentage, for example, approximately 10–20%, of the typical Raw Pressure Range.

An important feature of the invention is to dynamically determine the "true" low pressure point for the particular stylus operating in the particular user's environment, rather than relying on the "default" low pressure point based on the typical performance of styli of the particular type. The "true" low pressure point is the raw load count produced under a no-load condition. If it can be determined when the stylus is in a no-load condition, then the raw pressure count at this point can be obtained.

Most digitizers provide logic to determine when the stylus is too far away from the digitizer surface to provide a reliable signal, and in that "out of range" condition provide an out of range signal. In this embodiment, the out of range signal is used as an indicator that no pressure is being applied to the stylus, the stylus tip 32 being relatively far away from the digitizer tablet surface. If the stylus tip 32 is brought closer to the digitizer tablet surface, it will eventually come in range. The first time that the stylus tip 32 comes in range, a sample of the pressure will be used as a measure of the no-load or no-pressure applied condition of the stylus. As long as the sampling rate of the pressure applied to the stylus is high enough to assure that the first sample within range will occur before the tip is able to contact the digitizer tablet surface, this first sample will represent the minimum raw pressure count. Other techniques for determining that no pressure is being applied to the stylus tip, i.e., the stylus is in a no-load condition, are also possible, including, but not limited to allowing the user to notify the processor by some independent step (e.g., via the stylus 12, digitizer tablet 20 or the input device 17) that the stylus is in the no-load condition. Whether the stylus is within a particular range or proximity may be determined conventionally.

Figure 8:
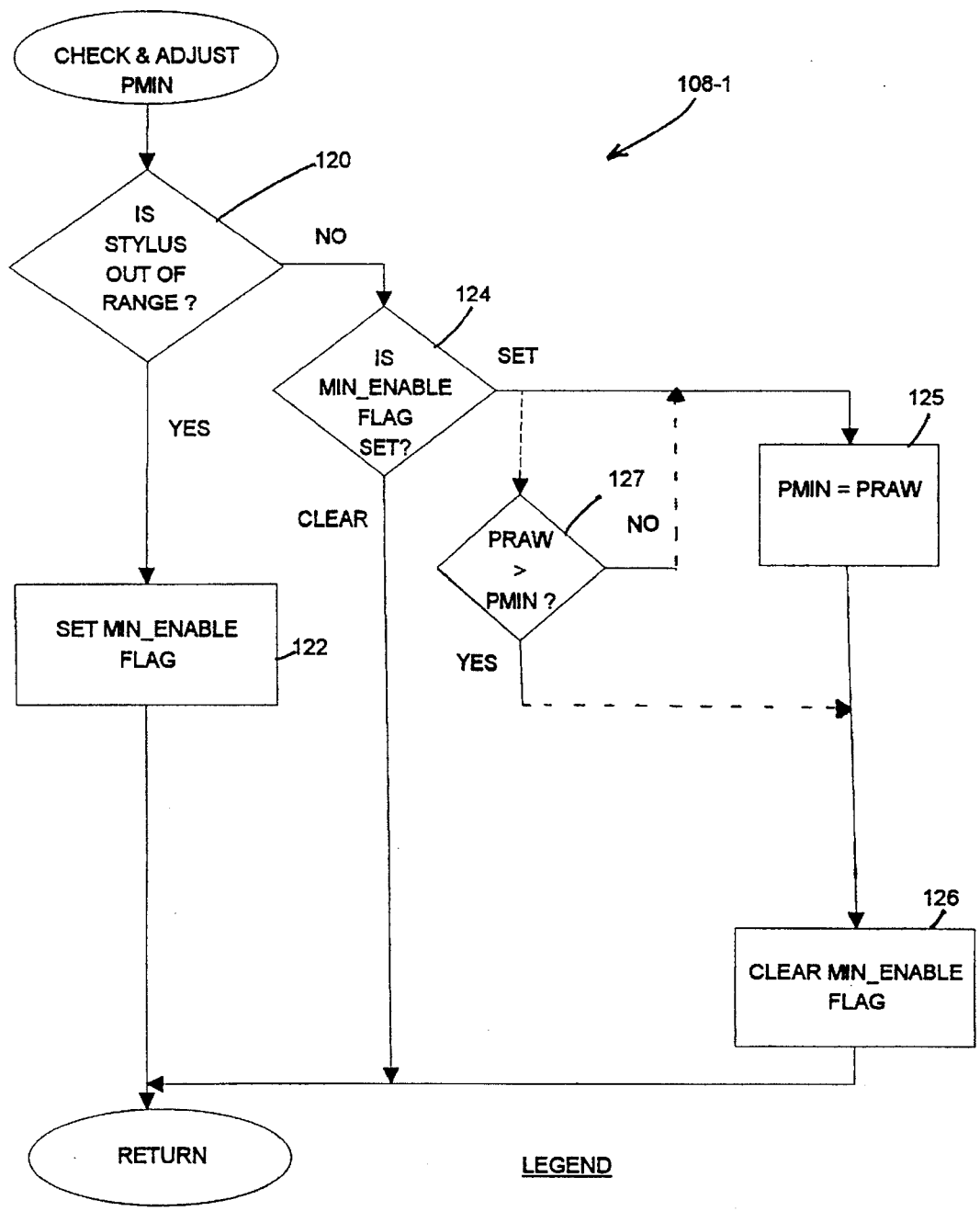
FIG. 8 is a flow chart of the "Check and Adjust PMin" routine of the flow chart depicted in FIG. 7.

FIG. 8 is a flow chart of a sub-routine for checking and adjusting the Minimum Raw Pressure Count. (PMIN) (step 108-1 in FIG. 7). In step 120, the processor determines whether the stylus 12 is out of range. If it is out of range, then in step 122 the MIN_ENABLE flag is set, and the processor proceeds to step 108-2 (FIG. 7). The MIN_ENABLE flag is used to identify when the stylus 12 first comes into range of the digitizer tablet surface. The flag is set when the stylus is out of range (step 122), then cleared when it comes into range (step 126). At the transition point (when the stylus is in range and the flag has not been cleared yet) (step 124), the minimum pressure (PMIN) is set to the Raw Pressure Count (FRAW) (step 125).

Steps 125 and 126 encompass the embodiments where no determination is made as to whether a current PRAW value exceeds the current PMIN value, and PMIN is simply made equal to PRAW, i.e., the current PRAW replaces the previous PRAW as PMIN, as well as where the determination is made, which is represented by step 127. In an implementation with step 127, the flow would be from decision step 125 to decision step 127 to step 125, and not directly from decision step 124 to step 125.

Figure 9:
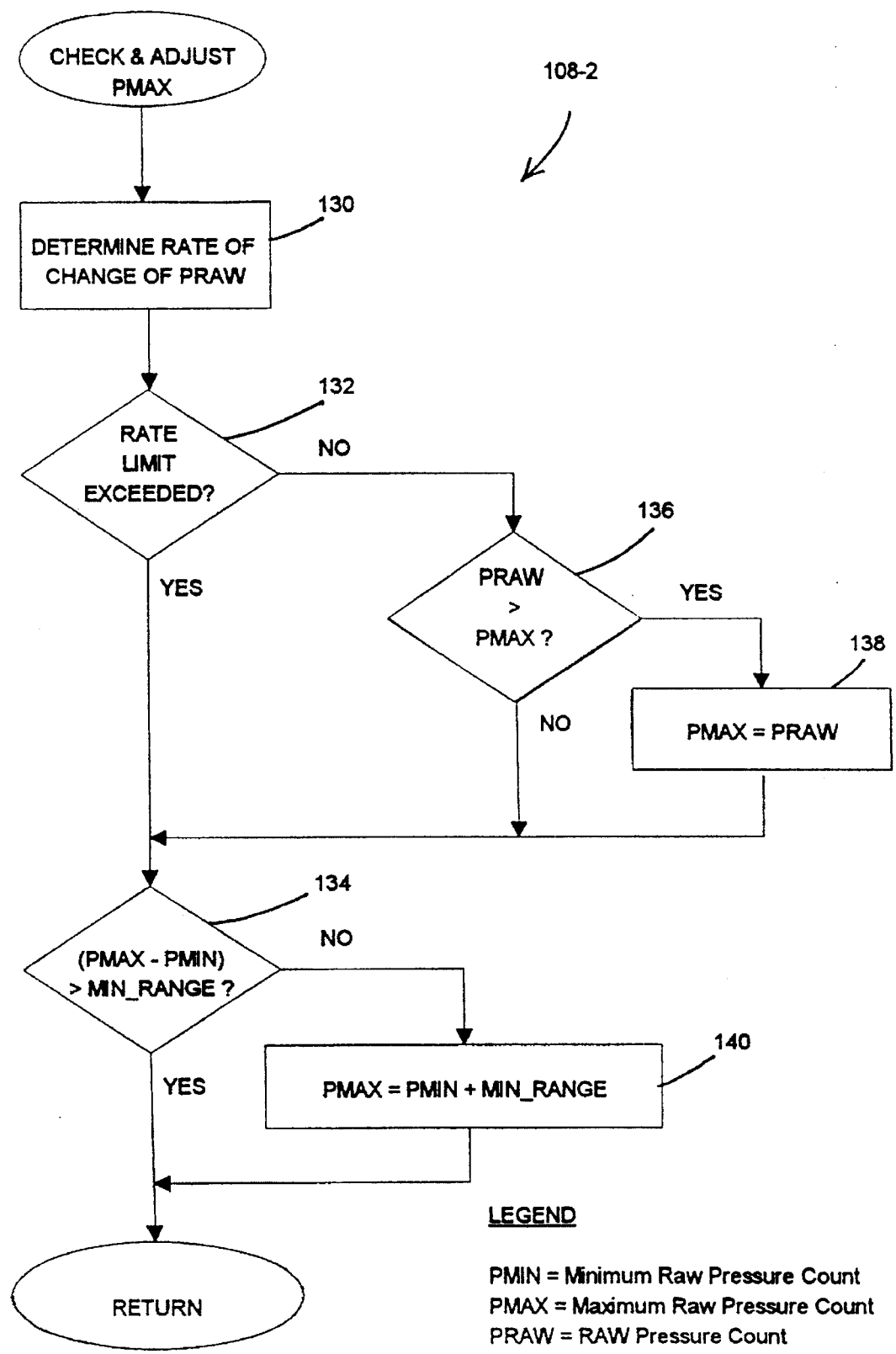
FIG. 9 is a flow chart of the "Check and Adjust PMax" routine of the flow chart depicted in FIG. 7.

FIG. 9 is a flow chart of a sub-routine for checking and adjusting the Maximum Raw Pressure Count (PMAX) (step 108-2 in FIG. 7). The processor 18 determines the rate of change of the Raw Pressure Count (PRAW) in step 130. The rate of change limit is a parameter which is chosen based on the pressure sampling rate, and the expected speed with which a user can change the pressure applied to the stylus. This limit is employed to distinguish between "noise spikes" and intentional changes. The noise spikes may be caused by electromagnetic interference, or by traumatic shock to the stylus tip. The rate of change is the difference between successive PRAW counts without the stylus having gone out of range. The rate of change limit is an empirically-determined percentage (e.g., 5%) of the Raw Pressure Count Range and may change as the Raw Pressure Count Range changes.

Figure 6:
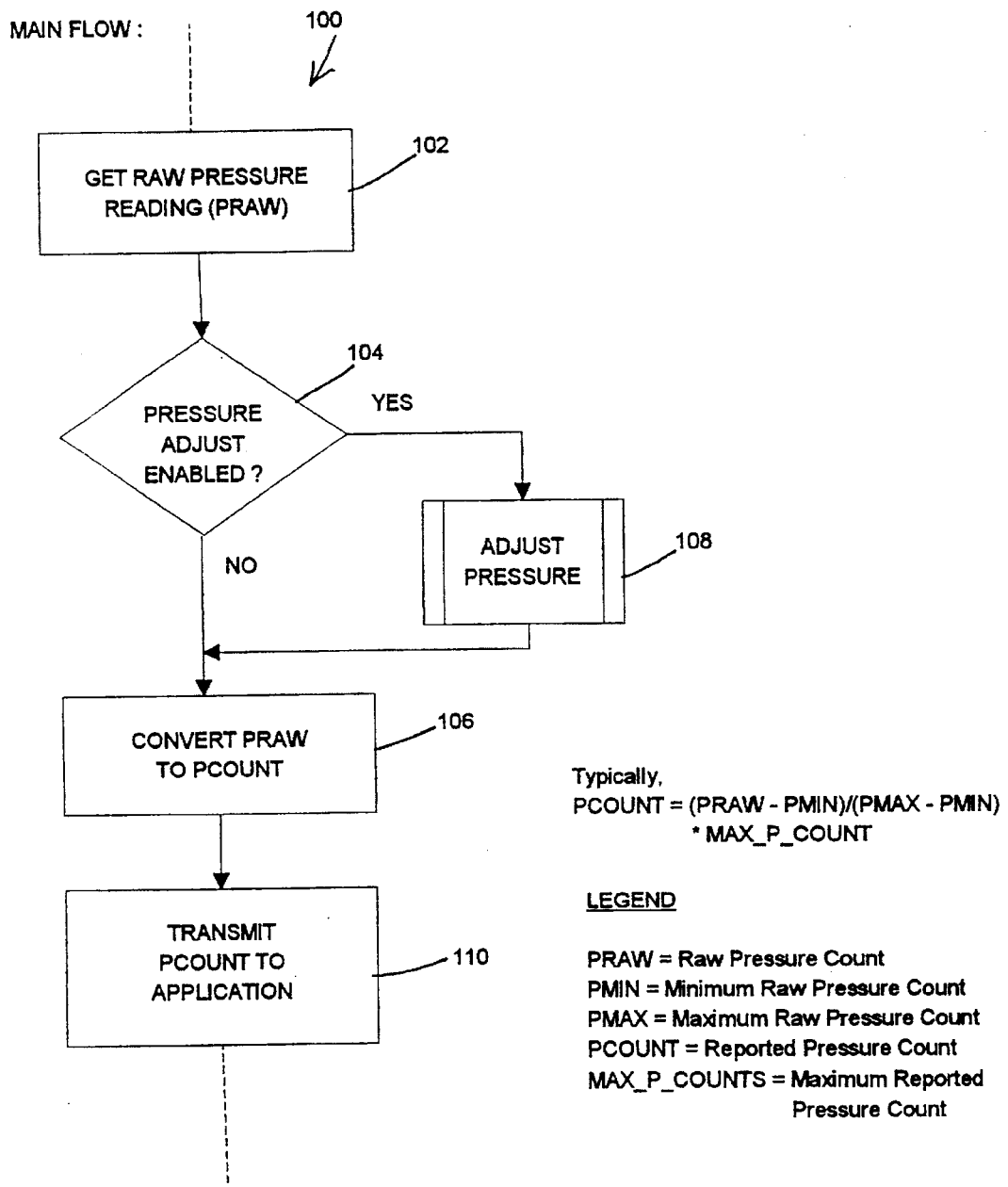
FIG. 6 is a portion of the main flow chart of the pressure reporting system of a digitizer illustrating incorporation of the invention therein.

If the rate of change exceeds a preselected limit, determined in step 132 (FIG. 9), and the Maximum Raw Pressure Count (PMAX) less the Minimum Raw Pressure Count (FMIN) exceeds the initial MIN_RANGE (step 134), then no change is made to the range and the program returns to step 106 of the main flow (FIG. 6). If the rate of change limit is not exceeded, then the processor determines in step 136 whether the Reported Pressure Count (PCOUNT) exceeds the Maximum Raw Pressure Count (PMAX). If it does, then in step 138 the processor sets the Maximum Raw Pressure Count (FMAX) to the Raw Pressure Count (PRAW), and proceeds to step 134. If PRAW does not exceed PMAX in step 136, the processor proceeds directly to step 134. If in step 134 it is determined that (PMAX-PMIN) does not exceed MIN_RANGE, then the processor in step 140 sets the Maximum Raw Pressure Count (PMAX) to the Minimum Raw Pressure Count (PMIN) plus the MIN_RANGE, and the program then returns to step 106 in the main flow (FIG. 6).

In an embodiment where a current PRAW value simply replaces a previous PRAW value as the PMAX value, the FIG. 9 flow chart applies, but with the step 136 determination omitted, and a modified step 138 in which a subsequent PRAW replaces a previous PRAW in response to a given condition, e.g., user input for the adjustment with the desired pressure being applied to the stylus.

In the semi-automatic mode referred to above, the digitizer allows the user to enable the semi-automatic mode and provides for user input. For example, semi-automatic operation may be enabled as described above, and same may also be sued to enable and disable pressure adjustment altogether. However, enablement and disablement of the automatic and semi-automatic modes is preferably accomplished through the host computer, e.g., initiated by input device 17. In the semi-automatic mode, the values set for PMAX and PMIN do not change, and they retain the values last set by the user until the user again enables the semi-automatic mode. After activating the semi-automatic mode, the user simply uses the stylus as he or she desires, and the pressure adjustment is carded out automatically, i.e., in the flow charts of FIG. 6 the check and adjust PMIN step (108-1) and the check and adjust PMAX step (108-2) are carded out automatically pursuant to the flow charts of FIGS. 8 and 9, respectively.

While the invention has been described and illustrated in connection with preferred embodiments, many variations, modifications and uses other than those disclosed as will be evident to those skilled in the relevant arts, may be made without departing from the spirit and scope of the invention. The invention as set forth in the appended claims is thus not to be limited to the precise details of construction and use set forth above as such variations, modifications and further uses are intended to be included within the spirit and scope of the invention as defined in the appended claims.

What is claimed is:

1. A method for adjusting, during use of a particular pressure transducer, the minimum value of raw pressure signals which are representative of the pressure applied to the particular pressure transducer and which are coupled from the particular transducer, and providing an adjusted pressure signal having an adjusted minimum signal value, comprising the steps of:

monitoring raw pressure signals coupled from the particular pressure transducer during use thereof;

selecting a minimum value that is higher than the lowest raw pressure signal value typically expected during use of the particular pressure transducer;

reducing the selected minimum value whenever, during use of the particular pressure transducer, the value of the raw pressure signal is less than the selected minimum value; and providing said adjusted pressure signal having as its adjusted minimum signal value the selected minimum value.

2. The method according to claim 1 wherein the monitoring step is carried out when no pressure is applied to the particular pressure transducer.

3. The method according to claim 1 wherein the monitoring step is carried out with pressure being applied to the particular pressure transducer.

4. Apparatus for adjusting, during use of a particular pressure transducer, the minimum value of raw pressure signals which are representative of the pressure applied to the particular pressure transducer and which are coupled from the particular transducer, and providing an adjusted pressure signal having an adjusted minimum value, comprising:

a programmed processor coupled to the particular pressure transducer to receive raw pressure signals during use of the particular pressure transducer and provide the adjusted pressure signals having an adjusted minimum value;

said processor being programmed to:

set a minimum signal value that is higher than the lowest signal value typically expected of the raw pressure signal to be coupled to said processor;

reduce the set minimum signal value whenever, during use of the particular pressure transducer, the value of the raw pressure signal received by said processor is less than the set minimum signal value; and provide said adjusted pressure-related signal with said adjusted minimum value thereof being the set minimum signal value.

5. A method for adjusting, during use of a particular pressure transducer, the maximum value of raw pressure signals which are representative of the pressure applied to the particular pressure transducer and which are coupled from the particular transducer, and providing an adjusted pressure signal having an adjusted maximum signal value, comprising the steps of:

monitoring raw pressure signals coupled from the particular pressure transducer during use thereof when pressure is being applied to the transducer;

selecting a maximum value that is lower than the highest raw pressure signal value typically expected during use of the particular pressure transducer;

increasing the selected maximum value whenever, during use of the particular pressure transducer, the value of the raw pressure signal is greater than the selected maximum value; and providing said adjusted pressure signal having as its adjusted maximum signal value the selected maximum value.

6. Apparatus for adjusting, during use of a particular pressure transducer, the maximum value of raw pressure signals which are representative of the pressure applied to the particular pressure transducer and which are coupled from the particular transducer, and providing an adjusted pressure signal having an adjusted maximum value, comprising:

a programmed processor coupled to the particular pressure transducer to receive raw pressure signals during use of the particular pressure transducer and provide the adjusted pressure signals having an adjusted maximum value;

said processor being programmed to:

set a maximum signal value that is lower than the highest signal value typically expected of the raw pressure signal to be coupled to said processor;

increase the set maximum signal value whenever, during use of the particular pressure transducer, the value of the raw pressure signal received by said processor is greater than the selected maximum signal value; and provide said adjusted pressure signal with said adjusted maximum value thereof being the selected maximum value.

7. A method for adjusting, during use of a particular pressure transducer, the range of raw pressure signals which are representative of the pressure applied to the particular pressure transducer and which are coupled from the particular transducer, and providing an adjusted pressure signal having an adjusted range, comprising the steps of:

(a) monitoring raw pressure signals coupled from the particular pressure transducer during use thereof; and providing an adjusted pressure signal having an adjusted minimum signal value, an adjusted maximum sisal value or both;

for providing the adjusted pressure signal with the adjusted minimum signal value, said method including the additional steps of:

(b) selecting a minimum value that is higher than the lowest raw pressure signal value typically expected during use of the particular pressure transducer when pressure is applied thereto;

(c) reducing the selected minimum value whenever, during use of the particular pressure transducer, the value of the raw pressure signal is less than the selected minimum value; and (d) providing said adjusted pressure signal having as its adjusted minimum signal value the selected minimum value;

for providing the adjusted pressure signal with the adjusted maximum signal value, said method including the additional steps of:

(e) selecting a maximum value that is lower than the highest raw pressure signal value typically expected during use of the particular pressure transducer;

(f) increasing the selected maximum value whenever, during use of the particular pressure transducer, the value of the raw pressure signal is greater than the selected maximum value; and (g) providing said adjusted pressure signal having as its adjusted maximum signal value the selected maximum value;

whereby the adjusted pressure signal has an adjusted range limited by either or both the adjusted minimum signal value or the adjusted maximum signal value.

8. Apparatus for adjusting, during use of a particular pressure transducer, the range of raw pressure signals which are representative of the pressure applied to the particular pressure transducer and which are coupled from the particular transducer, and providing an adjusted pressure signal having an adjusted range, comprising:

a programmed processor coupled to the particular pressure transducer to receive raw pressure signals during use of the particular pressure transducer and provide the adjusted pressure signals having an adjusted minimum value, an adjusted maximum value or both;

for providing the adjusted pressure signal with the adjusted minimum value, said processor being programmed to:

(a) set a minimum signal value that is higher than the lowest signal value typically expected of the raw pressure signal to be coupled to said processor;

(b) reduce the set minimum value whenever, during use of the particular pressure transducer, the value of the raw pressure signal received by said processor is less than the set minimum value; and (c) provide said adjusted pressure-related signal with said adjusted minimum value thereof being the set minimum value;

for providing the adjusted pressure signal with the adjusted maximum value, said processor being programmed to:

(d) set a maximum signal value that is lower than the highest signal value typically expected of the raw pressure signal to be coupled to said processor;

(e) increase the set maximum value whenever, during use of the particular pressure transducer, the value of the raw pressure signal received by said processor is greater than the set maximum value; and (f) provide said adjusted pressure signal with said adjusted maximum value thereof being the set maximum value; and whereby the adjusted pressure signal output by said processor has an adjusted range limited by either or both the adjusted minimum value or the adjusted maximum value.

9. In a digitizer comprising a pointing device having a pressure transducer associated therewith and means for determining the position of the pointing device relative to a surface of the digitizer, the method of adjusting, during use of a particular pointing device having associated therewith a particular pressure transducer, the minimum value of raw pressure signals which are representative of the pressure applied to the particular pressure transducer and which are coupled from the particular transducer to a processor of the digitizer, and providing an adjusted pressure signal having an adjusted minimum value, comprising causing the processor to perform the following steps according to a program associated with the processor:

monitoring in the processor raw pressure signals coupled from the particular pressure transducer during use thereof;

during use of the particular pressure transducer, reducing a preset minimum value set in the processor that is higher than the lowest raw pressure signal value typically expected during use of the particular pressure transducer to an adjusted minimum value whenever the value of the raw pressure signal is less than the preset minimum value, and thereafter reducing the last adjusted minimum value whenever the value of the raw pressure signal is less than the last adjusted minimum value; and providing the preset or last adjusted pressure signal having the adjusted minimum value as said adjusted pressure signal.

10. The method according to claim 9 wherein the monitoring step is carried out when no pressure is applied to the particular pressure transducer.

11. The method according to claim 9 wherein the monitoring step is carried out with pressure being applied to the particular pressure transducer.

12. In a digitizer comprising a pointing device having a pressure transducer associated therewith and means for determining the position of the pointing device relative to a surface of the digitizer, apparatus for adjusting, during use of a particular pointing device having associated therewith a particular transducer, the minimum value of raw pressure signals which are representative of the pressure applied to the particular pressure transducer and which are coupled from the particular pressure transducer, and providing an adjusted pressure signal having an adjusted minimum value, comprising:

a programmed processor coupled to the particular pressure transducer to receive raw pressure signals during use of the particular pressure transducer and provide the adjusted pressure signals having an adjusted minimum value;

said processor being programmed to:

set a preset minimum signal value that is higher than the lowest signal value typically expected of the raw pressure signal to be coupled to said processor;

reduce the preset minimum value to an adjusted minimum value whenever, during initial use of the particular pressure transducer, the value of the raw pressure signal received by said processor is less than the preset minimum value;

thereafter reduce the last adjusted minimum value whenever the value of the raw pressure signal is less than the last adjusted minimum value; and provide an adjusted pressure signal having the adjusted minimum value as said adjusted pressure signal.

13. The digitizer according to claim 12 wherein said processor is programmed to process received raw pressure signals and provide an adjusted pressure signal when no pressure is applied to the particular pressure transducer.

14. The digitizer according to claim 12 wherein said processor is programmed to process received raw pressure signals and provide an adjusted pressure signal when pressure is applied to the particular pressure transducer.

15. In a digitizer comprising a pointing device having a pressure transducer associated therewith and means for determining the position of the pointing device relative to a surface of the digitizer, the method of adjusting, during use of a particular pointing device having associated therewith a particular pressure transducer, the maximum value of raw pressure signals which are representative of the pressure applied to the particular pressure transducer and which are coupled from the particular pressure transducer to a processor of the digitizer, and providing an adjusted pressure signal having an adjusted maximum value, comprising causing the processor to perform the following steps according to a program associated with the processor:

monitoring in the processor raw pressure signals coupled from the particular pressure transducer during use thereof;

during initial use of the particular pressure transducer, increasing a preset maximum value set in the processor that is lower than the highest raw pressure signal value typically expected during use of the particular pressure transducer to an adjusted maximum value whenever the value of the raw pressure signal is greater than the preset maximum value, and thereafter increasing the last adjusted maximum value whenever the value of the raw pressure signal is greater than the last adjusted maximum value; and providing the preset or last adjusted pressure signal having the adjusted maximum value as said adjusted pressure signal.

16. In a digitizer comprising a pointing device having a pressure transducer associated therewith and means for determining the position of the pointing device relative to a surface of the digitizer, apparatus for adjusting, during use of a particular pressure transducer, the maximum value of raw pressure signals which are representative of the pressure applied to the particular pressure transducer and which are coupled from the particular transducer, and providing an adjusted pressure signal having an adjusted maximum value, comprising:

a programmed processor coupled to the particular pressure transducer to receive raw pressure signals during use of the particular pressure transducer and provide the adjusted pressure signals having an adjusted maximum value;

said processor being programmed to:

set a preset maximum signal value that is lower than the highest signal value typically expected of the raw pressure signal to be coupled to said processor;

increase the preset maximum signal value to an adjusted maximum signal value whenever, during initial use of the particular pressure transducer, the value of the raw pressure signal received by said processor is greater than the preset maximum signal value;

thereafter increase the last adjusted maximum signal value whenever the value of the raw pressure signal is greater than the last adjusted maximum signal value; and provide the preset or the last adjusted pressure signal having the adjusted maximum value as said adjusted pressure signal.

17. In a digitizer comprising a pointing device having a pressure transducer associated therewith and means for determining the position of the pointing device relative to a surface of the digitizer, a method for adjusting, during use of a particular point device having associated therewith a particular pressure transducer, the range of raw pressure signals which are representative of the pressure applied to the particular pressure transducer and which are coupled from the particular transducer, and providing an adjusted pressure signal having an adjusted range, comprising the steps of:

(a) monitoring raw pressure signals coupled from the particular pressure transducer during use thereof; and providing an adjusted pressure signal having an adjusted minimum signal value, an adjusted maximum signal value or both;

for providing the adjusted pressure signal with the adjusted minimum signal value, said method including the additional steps of:

(b) selecting a minimum value that is higher than the lowest raw pressure signal value typically expected during use of the particular pressure transducer when pressure is applied thereto;

(c) reducing the selected minimum value whenever, during use of the particular pressure transducer, the value of the raw pressure signal is less than the selected minimum value; and (d) providing said adjusted pressure signal having as its adjusted minimum signal value the selected minimum value;

for providing the adjusted pressure signal with the adjusted maximum signal value, said method including the additional steps of:

(e) selecting a maximum value that is lower than the highest raw pressure signal value typically expected during use of the particular pressure transducer;

(f) increasing the selected maximum value whenever, during use of the particular pressure transducer, the value of the raw pressure signal is greater than the selected maximum value; and (g) providing said adjusted pressure signal having as its adjusted maximum signal value the selected maximum value;

whereby the adjusted pressure signal has an adjusted range limited by either or both the adjusted minimum signal value or the adjusted maximum signal value.

18. In a digitizer comprising a pointing device having a pressure transducer associated therewith and means for determining the position of the pointing device relative to a surface of the digitizer, apparatus for adjusting, during use of a particular pressure transducer, the range of raw pressure signals which are representative of the pressure applied to the particular pressure transducer and which are coupled from the particular transducer, and providing an adjusted pressure signal having an adjusted range, comprising:

a programmed processor coupled to the particular pressure transducer to receive raw pressure signals during use of the particular pressure transducer and provide the adjusted pressure signals having an adjusted minimum value, an adjusted maximum value or both;

for providing the adjusted pressure signal with the adjusted minimum value, said processor being programmed to:

(a) set a minimum signal value that is higher than the lowest signal value typically expected of the raw pressure signal to be coupled to said processor;

(b) reduce the set minimum value whenever, during use of the particular pressure transducer, the value of the raw pressure signal received by said processor is less than the set minimum value; and (c) provide said adjusted pressure signal with said adjusted minimum value thereof being the set minimum value;

for providing the adjusted pressure signal with the adjusted maximum value, said processor being programmed to:

(d) set a maximum signal value that is lower than the highest signal value typically expected of the raw pressure signal to be coupled to said processor;

(e) increase the set maximum value whenever, during use of the particular pressure transducer, the value of the raw pressure signal received by said processor is greater than the set maximum value; and (f) provide said adjusted pressure signal with said adjusted maximum value thereof being the selected maximum value;

whereby the adjusted pressure signal output by said processor has an adjusted range limited by either or both the adjusted minimum value or the adjusted maximum value.

19. In a digitizer comprising a pointing device having a pressure transducer associated therewith and means for determining the position of the pointing device relative to a surface of the digitizer, the method of adjusting, during use of a particular pointing device having associated therewith a particular pressure transducer, the minimum or maximum value or both the minimum and the maximum of raw pressure signals which are representative of the pressure applied to the particular pressure transducer and which are coupled from the particular transducer to a processor of the digitizer, and providing an adjusted pressure signal having an adjusted minimum and/or maximum value, comprising causing the processor to perform the following steps according to a program associated with the processor:

monitoring in the processor raw pressure signals coupled from the particular pressure transducer during use thereof;

in response to a given condition, changing a preset minimum or maximum value that is different than the raw pressure signal value typically expected as a maximum or minimum value during use of the particular pressure transducer to an adjusted minimum or maximum value, and thereafter replacing a previous minimum and/or maximum value of the adjusted pressure signal with the present value of the raw pressure signal; and providing said adjusted pressure signal having as its adjusted minimum and/or maximum value the present value of the raw pressure signal.

20. In a digitizer comprising a pointing device having a pressure transducer associated therewith and means for determining the position of the pointing device relative to a surface of the digitizer, the method of adjusting, during use of a particular pointing device having associated therewith a particular pressure transducer, the minimum value of raw pressure signals which are representative of the pressure applied to the particular pressure transducer and which are coupled from the particular transducer to a processor of the digitizer, and providing an adjusted pressure signal having an adjusted minimum value, comprising causing the processor to perform the following steps according to a program associated with the processor:

monitoring in the processor raw pressure signals coupled from the particular pressure transducer during use thereof, in response only to a given condition, reducing a preset minimum value that is higher than the lowest raw pressure signal value typically expected during use of the particular pressure transducer to an adjusted minimum value whenever the value of the raw pressure signal is less than the preset minimum value, and thereafter replacing the last adjusted minimum value with the value of the present raw pressure signal; and providing the adjusted pressure signal having the adjusted minimum value as said adjusted pressure signal.

21. The method of claim 9 wherein said method is performed only in response to a given condition.

22. The method of claim 9, 19 or 20 wherein the digitizer senses the transition between the pointing device being out of range and in range of the digitizer surface, and wherein said method for providing an adjusted pressure signal with an adjusted minimum value is performed only in response to the digitizer sensing said transition.

23. The method of claim 9, 19 or 20 wherein the digitizer includes at least one manually operable switch coupled thereto, and wherein said method is performed in response to a given status or sequence of statuses of at least one switch.

24. The method of claim 9, 19 or 20 wherein the digitizer is coupled to a host computer, and a manually activated input device is also coupled to the host computer, and wherein said method is performed in response to a given status or sequence of statuses of the input device.

25. In a digitizer comprising a pointing device having a pressure transducer associated therewith and means for determining the position of the pointing device relative to a surface of the digitizer, apparatus for adjusting, during use of a particular pressure transducer, the minimum value, the maximum value or the minimum and maximum values of raw pressure signals which are representative of the pressure applied to the particular pressure transducer and which are coupled from the particular transducer, and providing an adjusted pressure signal having an adjusted minimum value and/or an adjusted maximum value, comprising:

a programmed processor coupled to the particular pressure transducer to receive raw pressure signals during use of the particular pressure transducer and provide the adjusted pressure signals having an adjusted minimum value and/or an adjusted maximum value;

said processor being programmed in response only to a given condition, to:

replace a previous minimum and/or maximum value of the raw pressure signals received by said processor whenever the value of the raw pressure signal received by said processor is less than or greater than, respectively, the previous minimum and/or maximum value; and provide as the adjusted pressure signal a pressure signal having as its minimum and/or maximum value the replaced minimum or maximum value, respectively.

26. In a digitizer comprising a pointing device having a pressure transducer associated therewith and means for determining the position of the pointing device relative to a surface of the digitizer, apparatus for adjusting, during use of a particular pressure transducer, the minimum value of raw pressure signals which are representative of the pressure applied to the particular pressure transducer and which are coupled from the particular transducer, and providing an adjusted pressure signal having an adjusted minimum value, comprising:

a programmed processor coupled to the particular pressure transducer to receive raw pressure signals during use of the particular pressure transducer and provide the adjusted pressure signals having an adjusted minimum value;

said processor being programmed to:

in response only to a given condition, reducing a preset minimum value set in the processor that is higher than the lowest raw pressure signal value typically expected during use of the particular pressure transducer to an adjusted minimum value whenever the value of the raw pressure signal is less than the preset minimum value, and thereafter reducing the last adjusted minimum value whenever the value of the raw pressure signal is less than the last adjusted maximum value; and providing the adjusted pressure signal having the adjusted minimum value as said adjusted pressure signal.

27. The digitizer of claim 12 wherein said processor is programmed to process received raw pressure signals and provide an adjusted pressure signal only in response to a given condition.

28. The digitizer of claim 12, 25 or 26 wherein said processor is programmed to sense the transition between the pointing device being out of range and in range of the digitizer surface, and to process the raw position signals and provide an adjusted pressure signal with an adjusted minimum value only in response to the processor sensing said transition.

29. The digitizer of claim 12, 25 or 26 including at least one manually operable switch coupled thereto, and wherein said processor is programmed to process the raw position signals and provide an adjusted pressure signal only in response to a given status or sequence of statuses of said at least one switch.

30. The digitizer of claim 12, 25 or 26 coupled to a host computer, and a manually activated input device also coupled to the host computer, and wherein said processor is programmed to process the raw position signals and provide an adjusted pressure signal only in response to a given status or sequence of statuses of said input device.

31. The method of claim 1 wherein said step of providing said adjusted pressure signal includes transforming raw pressure signals into a range of adjusted pressure signals having a maximum value and having a minimum value which is said adjusted minimum value.

32. The method of claim 5 wherein said step of providing said adjusted pressure signal includes transforming raw pressure signals into a sample of adjusted pressure signals having a minimum value and having a maximum value which is said adjusted maximum value.

33. The apparatus of claim 4 wherein said processor is programmed to transform raw pressure signals into a range of adjusted pressure signals having a maximum value and having a minimum value which is said adjusted minimum value.

34. The apparatus of claim 6 wherein said processor is programmed to transform raw pressure signals into a sample of adjusted pressure signals having a minimum value and having a maximum value which is said adjusted maximum value.

35. The method of claim 1, 7, or 17 wherein the step of reducing the selected minimum value comprises setting the selected minimum value equal to the value of the raw pressure signal.

36. The method of claim 5, 7, or 17 wherein the step of increasing the selected minimum value comprises setting the selected maximum value equal to the value of the raw pressure signal.

37. The method of claim 9 wherein the steps of reducing the preset minimum value to an adjusted minimum value and reducing the last adjusted minimum value comprise setting the adjusted or last adjusted minimum value equal to the value of the raw pressure signal.

38. The method of claim 15, wherein the steps of increasing the preset maximum value to an adjusted maximum value and increasing the last adjusted maximum value comprise setting the adjusted or last adjusted maximum value equal to the value of the raw pressure signal.

39. The method of claim 19, wherein the step of changing the preset minimum or maximum value to an adjusted minimum or maximum value comprises setting the adjusted minimum or maximum value equal to the value of the raw pressure signal.

40. The method of claim 20 wherein the step of reducing the preset minimum value to an adjusted minimum value comprises setting the adjusted minimum value equal to the value of the raw pressure signal.

* * * * *